United States Patent [19]

Kucik

[11] Patent Number: 5,781,120
[45] Date of Patent: Jul. 14, 1998

[54] PNEUMATICALLY OPERATED SAFETY GATE

[76] Inventor: Michael Kucik, 4603 Hazelwood Ave., Baltimore, Md. 21206

[21] Appl. No.: 819,711

[22] Filed: Mar. 25, 1997

[51] Int. Cl.$^6$ ............................................. B60Q 1/00
[52] U.S. Cl. ...................... 340/425.5; 340/433; 340/463; 340/468; 340/471; 340/472; 340/473; 340/475
[58] Field of Search .................. 340/425.5, 475, 340/433, 463, 464, 468, 470, 471, 472, 473

[56] References Cited

U.S. PATENT DOCUMENTS

| | | |
|---|---|---|
| 1,834,557 | 5/1931 | Van Duyn. |
| 2,503,974 | 4/1950 | Sparaco ................................ 340/475 |
| 2,671,891 | 3/1954 | Kent ................................ 340/475 |
| 2,920,309 | 1/1960 | Fultz. |
| 3,133,265 | 5/1964 | Fultz. |
| 3,783,267 | 1/1974 | Thomas ................................ 340/475 |
| 3,784,974 | 1/1974 | Hamashige ................................ 340/475 |
| 4,297,675 | 10/1981 | Rubottom et al. |
| 4,339,744 | 7/1982 | Latta, Jr. |
| 4,559,518 | 12/1985 | Latta, Jr. |
| 4,825,192 | 4/1989 | Wells. |
| 4,956,630 | 9/1990 | Wicker. |
| 5,281,948 | 1/1994 | Estrada. |
| 5,355,117 | 10/1994 | Jefferson. |
| 5,430,625 | 7/1995 | Abarr et al. ................................ 340/475 |
| 5,635,901 | 6/1997 | Hochstein ................................ 340/433 |

*Primary Examiner*—Thomas Mullen
*Assistant Examiner*—Nina Tong
*Attorney, Agent, or Firm*—Robert E. Bushnell, Esq.

[57] ABSTRACT

A moveable traffic turn indicator may be constructed with a first elongate member exhibiting a first major surface terminated by a first end, a second elongate member exhibiting a second major surface terminated, a hinge pivotably joining the second elongate member to the first elongate member, and a double acting actuator coupled between the first elongate member and the second elongate member to drive the second elongate member between a retracted position with the second major surface in juxtaposition alongside the first major surface and a deployed position with the second major surface obliquely oriented relative to the first major surface to fully expose indicia borne by the second major surface.

15 Claims, 6 Drawing Sheets

PNEUMATICALLY OPERATED SAFETY GATE

BACKGROUND OF THE INVENTION

The present invention concerns vehicle safety appliances generally, and, more particularly, turn gates and processes for securing the blind side of an articulated vehicle against other passing vehicles while the articulated vehicle negotiates a turn.

DESCRIPTION OF RELATED ART

Contemporaneously with the development of the motor vehicle, efforts have been made to equip vehicles and the accommodating roadway with safety appliances designed to ameliorate the risk of collisions between vehicles, as well as between vehicles and pedestrians. Until recently, greater efforts have been devoted to enhancing the safety on and around passenger carrying vehicles, than freight carrying vehicles.

Contemporary road design and traffic patterns, particularly in urban areas, all too frequently place intersecting roadways at right angles, with a radius of curvature between the right-hand lanes that is shorter than the turning radius of an articulated vehicle such as a tractor-trailer. Consequently, in order to give the fifth wheel a greater radius of curvature for a right-hand turn, it is usually necessary for the operator of the articulated vehicle traveling along the right-hand lane of a boulevard to first turn the vehicle to the left and to drive the tractor into the middle, or even into the left lane of the boulevard, and to then begin a right-hand turn into an intersecting roadway from the middle, or left lane of the boulevard. While the tractor is making its left turn maneuver, the path of travel of the tractor relative to the trailer prevents the operator from using the side view mirrors of the tractor to see the traffic traveling on the boulevard alongside the trailer. Moreover, the turn signals mounted on the tractor are, because of the temporary left-turn orientation of the tractor, not visible to a vehicle traveling along the right side of the trailer; similarly, the turn signal on the rear end of the trailer are not visible to that vehicle. Furthermore, the path of travel of the trailer tends to be substantially parallel to the underlying boulevard during the left turn maneuver because the effect of the left turn maneuver by the tractor upon the path of travel of its trailer is slight; consequently, a vehicle either in the process of overtaking the trailer or traveling alongside the trailer does not receive any visual stimulus of an impending right-hand turn from the direction of travel of the trailer. Consequently, when the left-turn maneuver is completed and the tractor is subsequently turned to implement a right turn onto an intersecting roadway, the trailer will be accidentally drawn, without warning to the driver of either the tractor or the vehicle, across the path of any vehicle traveling along the right side of the trailer.

I have noticed that both early efforts in the art such as the Flashing Stop Sign of H. E. Fultz, U.S. Pat. No. 2,920,309, as well as his latter School Bus Stop Signal, U.S. Pat. No. 3,133,265, and recent efforts in the field of vehicular safety such as Estrada, Folding School Bus Stopping Arm, U.S. Pat. No. 5,281,948, and Jefferson, Vehicle Warning Sign, U.S. Pat. No. 5,355,117, have consistently focused upon gates or arms mounted upon the sides of buses or vans that travel in a substantially straight path, and have failed to appreciate the fact that gates and signs would be obscured from the field of view of motorists passing on the right side if the bus, or van, was required to engage in a left-turn maneuver before undertaking the actual right-turn. Moreover, these devices frequently require either manual effort or the relaxation of springs to return the gate or arm to its rest position. Manual effort is inconvenient for the operator of the vehicle while spring loaded gates and arms are unable to apply a constant force to the arm as the arm nears its rest position. Furthermore, I have found that the designs provided by these efforts fail to enable installation of a remotely activated, moveable turn indicator that will remain visible to neighboring motorists traveling along the right side of the trailer while the tractor-trailer prepares to initiate a right-hand turn onto an intersecting road.

Other efforts in the art such as those represented by Rubottom et al., for a Supplemental Right Turn Signal For Semitrailers, U.S. Pat. No. 4,297,675, have endeavored to use a stationary, albeit illuminated sign to warn neighboring motorists traveling along the right side of a tractor-trailer of impending right turns. I have discovered that such illuminated signs are all too frequently disregarded by motorists because the message broadcast by the sign is contrary to the contemporary expectations of the motorists about the future path of travel of the tractor-trailer; specifically, because the period for activation of illuminated trailer turn signals in terms of time and distance vary widely, and because such illuminated stationary signs are often either activated substantially in advance of the actual right turn or are inadvertently left illuminated while the tractor-trailer travels some distance in a straight line, neighboring motorists tend to disregard the illuminated signs and rely upon their current sensory perception with the expectation that because the trailer is currently traveling in a straight line, that the trailer will continue to travel in the same straight line for a substantial period. Moreover, at best, an illuminated signal is a passive, low wattage signal, small in size, and easily overlooked, particularly when coated with road dirt. In many daylight situations for example, the overpowering brightness of the sunlight masks the illumination provided by the sign, thereby greatly reducing the likelihood that the motorist will notice that the turn signal has been activated. This creates an undesirable risk of collision between a right turning trailer and the neighboring automobile.

SUMMARY OF THE INVENTION

It is therefore, one object of the present invention to provide an improved device and process for reducing the risk of collusion between road vehicles.

It is another object to provide a prominent, movable device that may be easily installed on contemporary semitrailers, to alert neighboring motorists of the imminency of a turn by the semitrailer.

It is still another object to provide a prominent, movable device for signaling motorists traveling in the proximity of a semitrailer, of the direction and imminency of a turn by the semitrailer.

It is yet another object to provide a prominent, movable turn indicator that may be easily installed beneath a semitrailer and operated by the exiting utilities already carried by the semitrailer.

It is still yet another object to provide a device and process for protecting the blind side of a vehicle while that vehicle is maneuvering to turn across the roadway extending along its blind side.

It is a further object to provide a device and process for alerting neighboring vehicles to the risk of collision while alongside a leading vehicle that in preparation for a turn in one direction, has maneuvered in an opposite direction.

It is a still further object to provide a device and process for protecting the roadway alongside a maneuvering tractor and trailer combination from the presence of passing vehicles while the rear view mirrors of the maneuvering road tractor are blind to the roadway.

It is a yet further object to provide a process and moveable turn indicator that may be easily installed along the right underside of a semitrailer.

It is a still yet further object to provide a remotely activated, moveable turn indicator that will remain visible to neighboring motorists traveling along the right side of the trailer while the tractor-trailer prepares to initiate a right-hand turn onto an intersecting road.

It is also an object to provide a remotely controllable, movable turn indicator for a semitrailer that applies a substantially constant force while pivoting the arm to both its rest position as well as to its deployed position.

It is an additional object to provide a process and device for indicating imminent turns, that can be easily installed and implemented with most of the contemporary designs of semitrailers.

These and other objects may be achieved with a movable vehicular traffic turn indicator that may be mounted beneath the right side of a trailer, and operated with the existing utilities already carried by the semitrailer to provide motorists traveling in proximity to the trailer, and especially along the right side of the trailer, with an indication of a right-hand turn while the trailer is being drawn by a road tractor. In one embodiment, the device may be constructed with a first elongate member exhibiting a first major surface terminated by a first end, a second elongate member exhibiting a second major surface terminated by a second end, and a double acting piston actuator coupled between the first elongate member and the second elongate member to drive the second elongate member between a retracted position with the second major surface in juxtaposition to said first major surface and a deployed position with the second major surface being obliquely oriented relative to the first major surface and fully exposing to the eyesight any warning indicia borne by the second major surface.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF A PREFERRED EMBODIMENT

Figure 1:
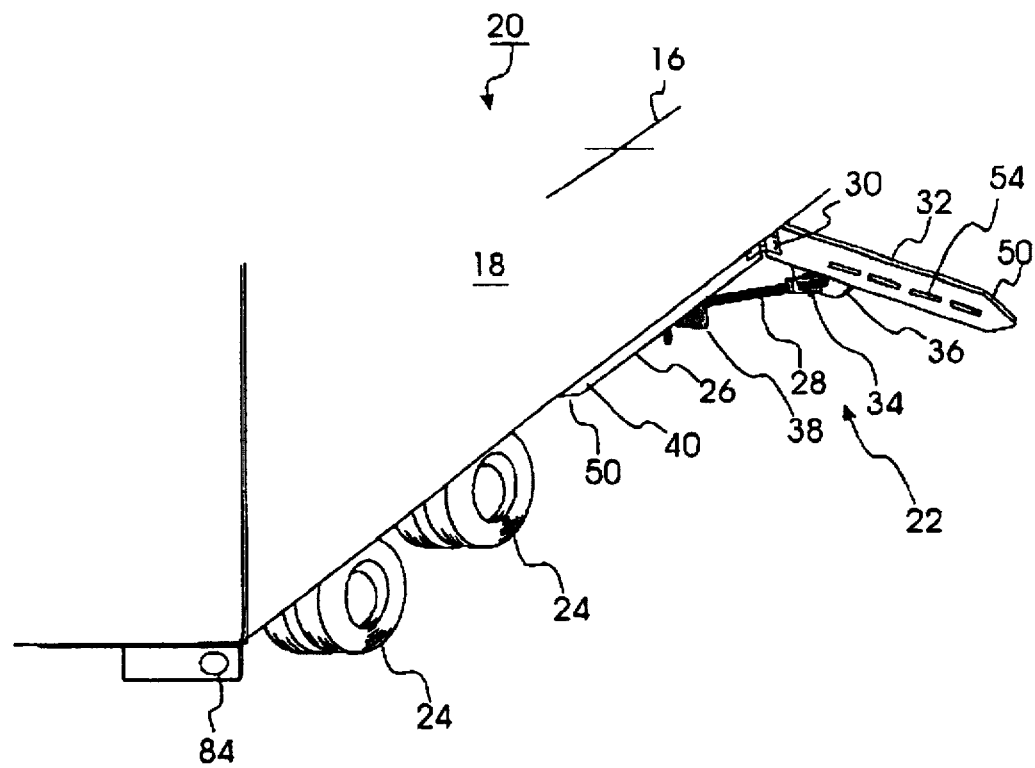
FIG. 1 is a perspective view showing an application of one embodiment of the present invention while that embodiment is in a deployed operational state.
Figure 2:
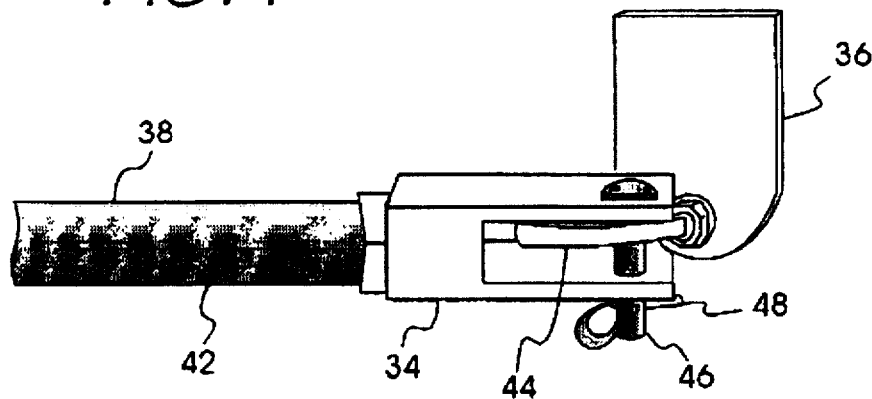
FIG. 2 shows a detailed perspective view of one articulated joint incorporated into the embodiment shown in FIG. 1.

Turning now to the drawings, FIG. 1 shows a perceptive view of a semitrailer 20 of the type having a fifth wheel 16 mounted on the center line at its forward end, protruding downwardly to be engaged and drawn by a road tractor 14. A right-hand turn indicator 22 constructed according to the principles of the present invention, is installed beneath trailer 20, along a linear gap between the fifth wheel and the set of dual rear wheels 24 of the trailer 20. Turn indicator 22 is mounted beneath the underside of trailer 20, with one elongate member 26 extending in a four and aft orientation with its major planar surface 40 line in a coplanar relation with the vertical right side 18 of trailer 20, whereby the major elongate surface 40 of member 26 depends vertically downwardly from the under surface of trailer 20, towards the underlying roadbed.

As shown in FIG. 1, indicator 22 has a commercially available, double-acting, fluid operated (e.g., hydraulic, or preferably, pneumatic) actuator 42 housed in a cylinder 38, with an internal piston (not shown) driving a rod 28 in reciprocation relative to the longitudinal axis of cylinder 38. As shown in greater detail in FIGS. 2, 3, 4 and 6, bracket 66 at the proximal end of cylinder 38 is pivotally coupled via rotatable fastener 64 to the backside of elongate member 26. The distal end of rod 28 is connected to a clevis 34, which in turn, is articulately connected via an eye bolt 44 and pin 46 extending through the eye of bolt 44, to a gusset 36 attached to the second elongate member 32. A cotter pin 48 holds the distal end of pin 46 within clevis 34. As shown in FIGS. 1 and 4, a plurality of indicia 54 are mounted upon the major exposed vertical surface 52 of the second elongate member 32. A pair of electrical leads 82 couple lamps mounted within indicia 54, are plug connectable via electrical plug 86 into, and draw electrical energy from the existing electrical circuit for the right-hand turn signal 84 of trailer 20.

Figure 3:
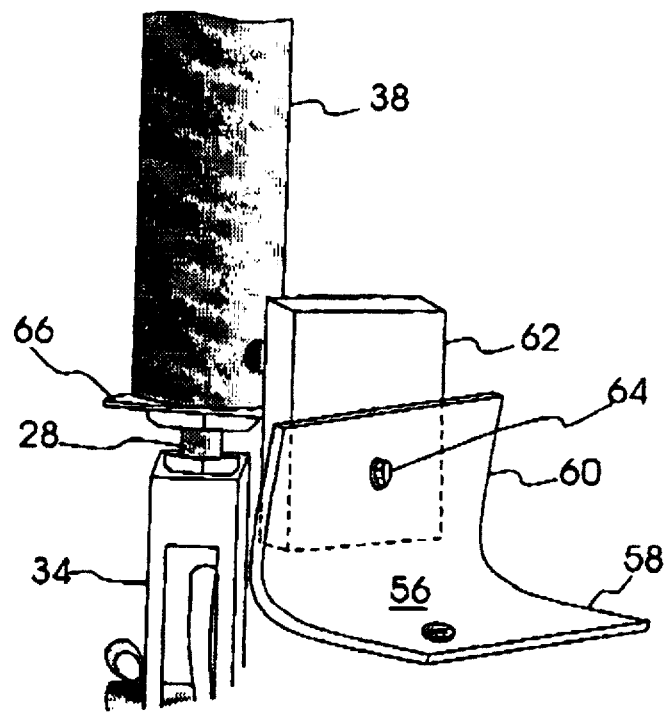
FIG. 3 shows a detailed perspective view of a bracket supporting an actuator incorporated into the embodiment of FIG. 1.
Figure 5:
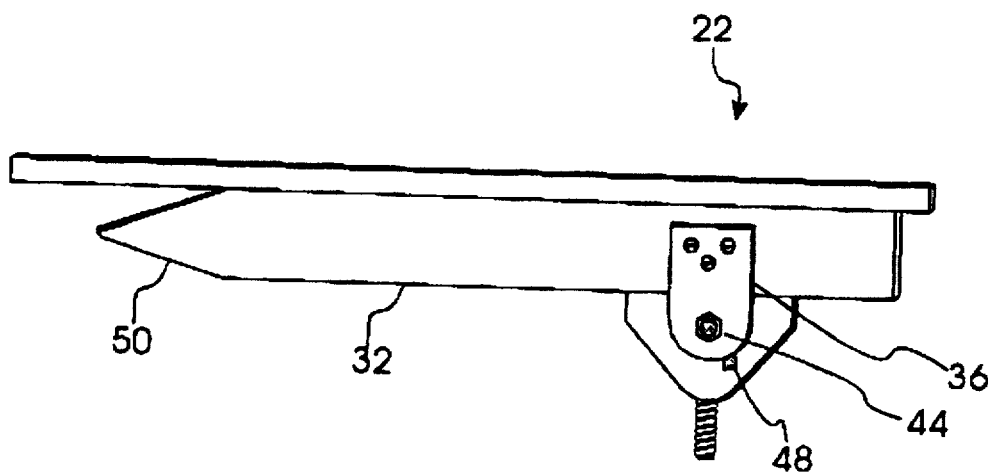
FIG. 5 shows a side elevational view of the embodiment of FIG. 1.
Figure 4:
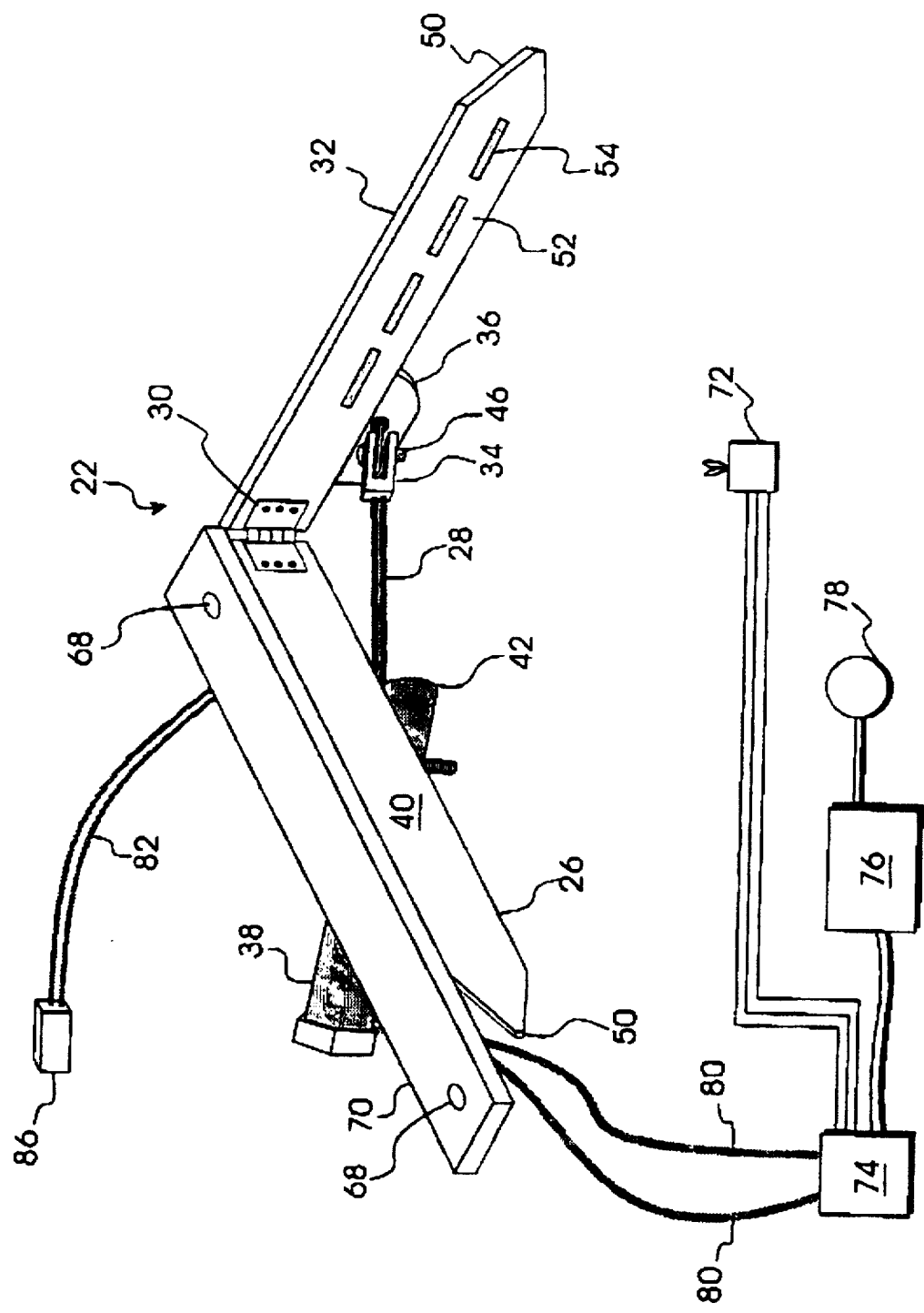
FIG. 4 shows an isometric view with the embodiment of FIG. 1 shown in a deployed position while removed from beneath the bed of the semitrailer.
Figure 6:
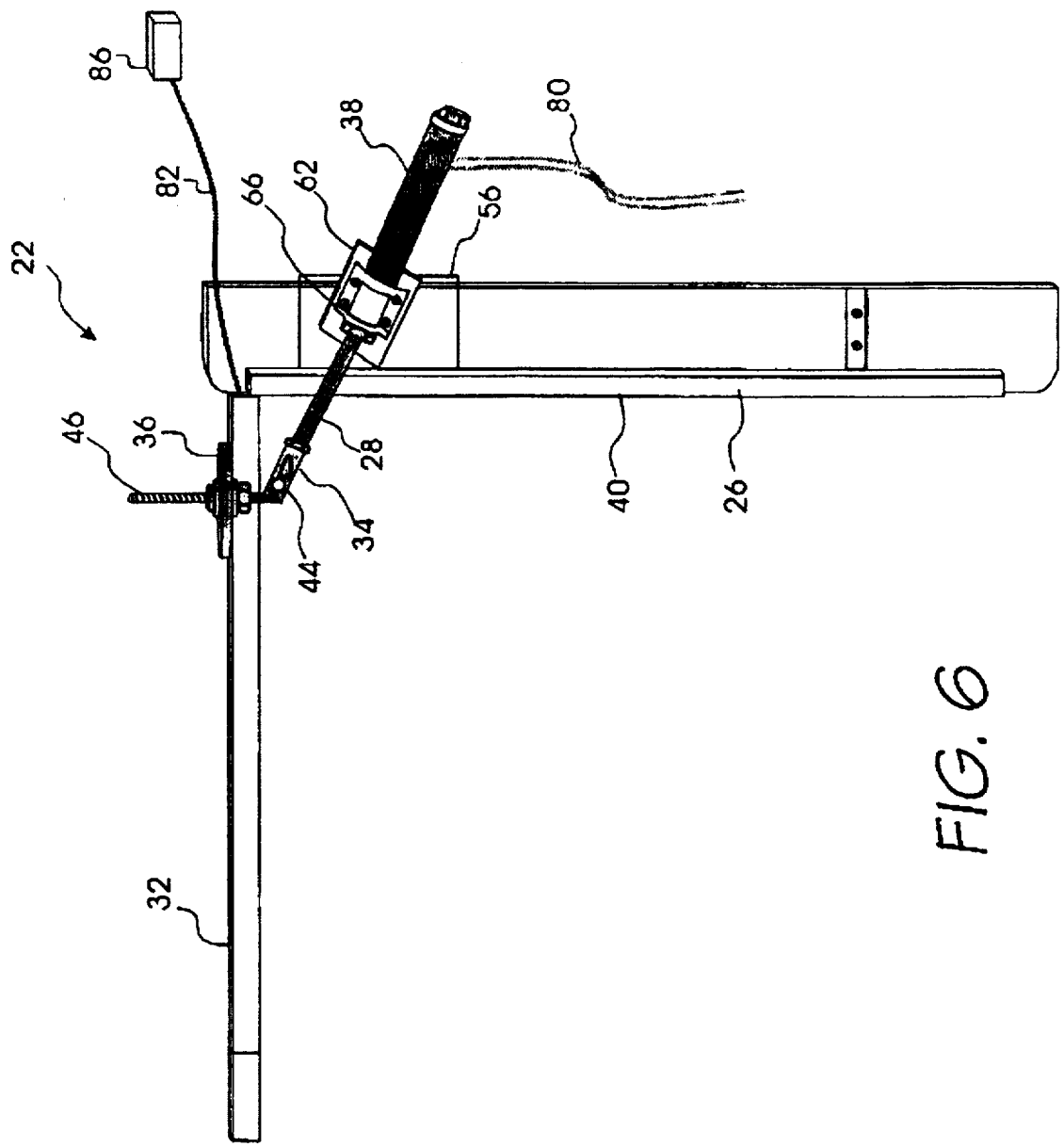
FIG. 6 shows a bottom elevational view of the embodiment.

Turning now to FIG. 3, an L-shaped bracket 56 has one flange 58 mounted upon the inside surface of the first elongate member 26, while the second flange 60 is pivotally attached to a spacer 62 by a single, rotatable bolt 64. A bracket 66 extending orthogonally to the longitudinal axis of cylinder 38 is bolted onto one flange of L-shape bracket 66. The orthogonal flange of L-shaped bracket 66 is clamped against the proximal end of cylinder 38.

FIG. 4 shows arm 32 driven by the extended rod 28 of actuator 42 into its deployed mode, with illuminated indicia 54 fully exposed. Indicia 54 are plug connectable to an electrical circuit providing electrical power to a turn signal carried by road trailer 20 by leads 82 and plug 86, which provide electrical energy illuminating indicia 54 during energization of the electrical circuit illuminating turn signal 84. Flange 70 is positioned orthogonally to elongate member 26, with apertures 68 in flange 70 positioned to allow flange 70 to lie flat against, and be fastened via threaded fasteners passing through apertures 68 to the undersides of the structural joists supporting the floor, or bed, of semitrailer 20. Air lines 80, are coupled between opposite ends of cylinder 38 and different output ports of an electrically operated solenoid valve 74. The operator of the road tractor drawing the semitrailer may, by toggling electrical switch 72, control the discharge of air pressure from pressure reservoir 76 via valve 74, to opposite ends of actuator 42, thereby causing either the deployment, or alternatively, the retraction of arm 32. A pneumatic pump 72 mounted on, and driven by the engine of road tractor 14, keeps sufficient air pressure within reservoir 76.

The two degrees of rotation enabled by the pivot of the proximal end of cylinder 38 via rotatable fastener 64, in conjunction with the articulation of the connection between the distal end of rod 28 and second elongate member 32, ensure rapid, positive deployment of arm 32 as well as retraction of arm 32, with a small size, low volume pneumatic piston actuator 42. It is this feature that enables the turn indicator to be quickly installed beneath a semitrailer, and operated with the use of the existing air and electrical utilities with which the semitrailer is customarily factory equipped.

Typically, elongate members 26, 32 have substantially identical shapes, lengths, widths and thicknesses. Both members may have a pointed, arrow-head shaped distal end 50 for example, with the arrow-head shape 50 of arm 32 indicating the direction of the impending turn.

Figure 7B:
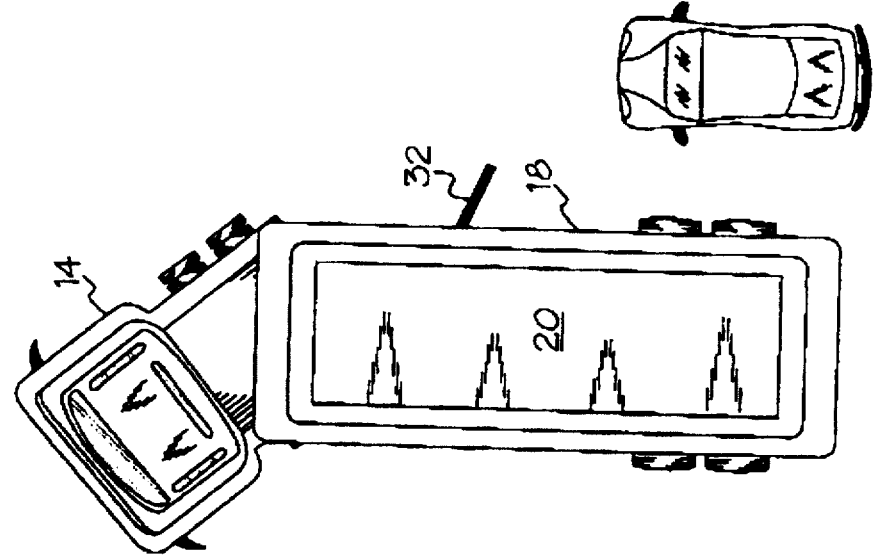
FIGS. 7A through 7D show an four parts, the sequence of movement of tractor-trailer as progresses through a left-hand turn maneuver and begins to make a right-hand turn in traffic.
Figure 7A:
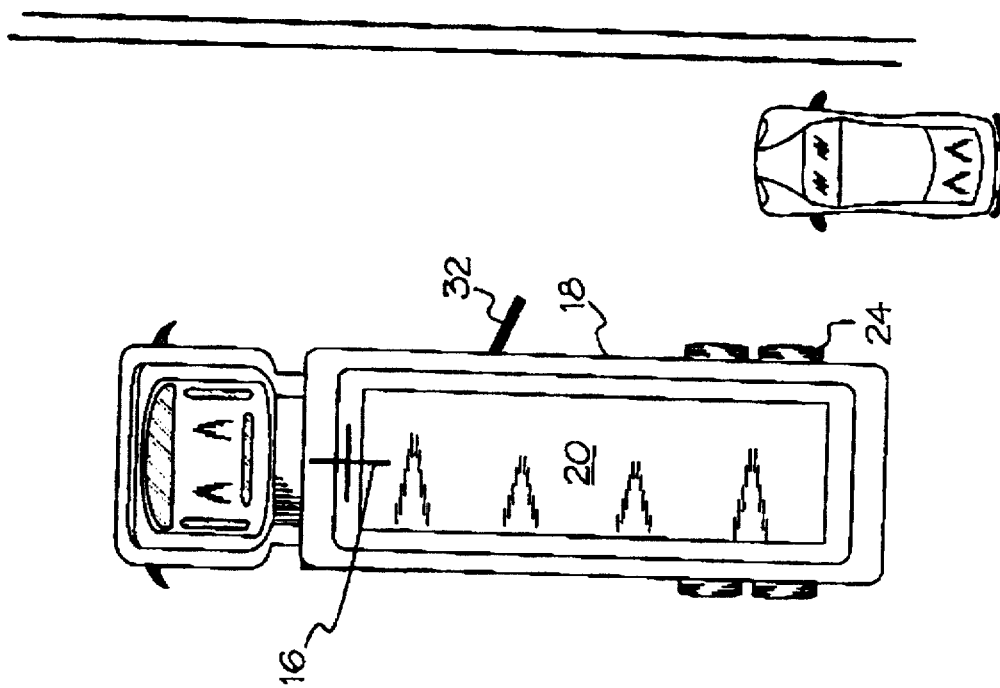
Figure 7D:
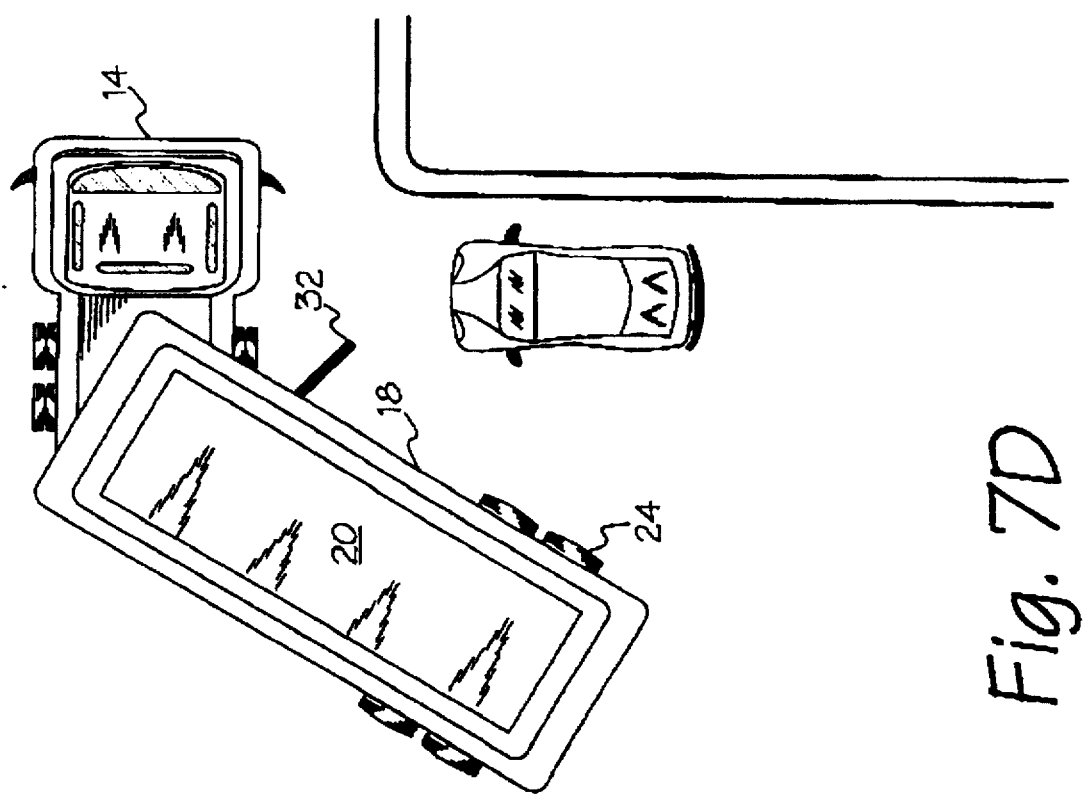

The foregoing embodiment of the turn indicator may be readily installed beneath the bed of a semitrailer 20. As shown in FIG. 7A, a road tractor 14 pulls the fifth wheel 16 of a semitrailer 20, and draws the semitrailer 20 in a relatively straight line through one lane of traffic prior to initiating a turn. When contemplating an imminent right-hand turn, the operator of the tractor-trailer toggles switch 72 mounted within arms reach of the operator inside the cab of road tractor 14, in order to activate solenoid valve 74 and release pneumatic pressure from reservoir cylinder 76 into the distal end of actuator cylinder 38, thereby driving arm 32 to pivot outwardly from the right side of trailer 20. The radius of curvature between the multi-lane boulevard shown in FIGS. 7A through 7D, and the intersecting road shown in FIG. 7D, is shorter than the turning radius of the tractor-trailer combination. Consequently, it is necessary for the tractor-trailer to make a right-hand turn from the inside lane of traffic, as opposed to the curb lane. Additionally, and in order to increase the radius of curvature of the path of travel to be followed by the trailer 20, as shown in FIG. 7B the tractor turns to the left and draws the front end of trailer 20 further away from the curb. Arm 32 remains deployed outwardly, as shown in FIG. 7B, during this left turn maneuver.

Figure 7C:
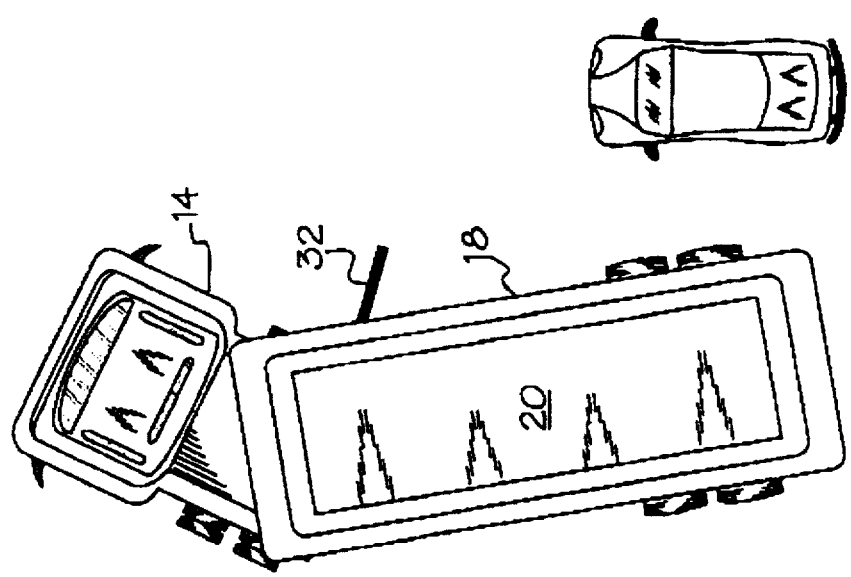

Subsequently, arm 32 stays deployed and remains readily visible to the driver of the automobile as shown in FIG. 7C, while the road tractor turns to the right and the trailer continues to travel toward the left. When the road tractor crosses the path of the automobile as shown in FIG. 7D, arm 32 may remain deployed although it has essentially served its function; when the road tractor draws trailer 20 out of the intersection and the path of the automobile, into the intersecting road, the operator of the road tractor may toggle switch 74 to enable solenoid valve to release pneumatic pressure into the proximal end of cylinder 38 and thereby continuously driving the piston of actuator 42 toward the distal end of cylinder 38, thus returning arm 32 to its rest position against the major elongated surface 40 of member 26. During the entire sequence of maneuvers shown in FIGS. 7A through 7D, arm 32 of the right turn indicator remains prominently visible to the motorist operating the automobile alongside trailer 20. Moreover, the deployment of arm 32 at the initial stage of the right-hand turn, as shown by FIG. 7A, provides the motorist with the active, prominent movement of the arm, which itself is a dramatic indication of the imminence and danger of the right-hand turn that can not be as easily ignored as can be a turn signal that is flashing while directly illuminated by sunlight.

It should be noted that the embodiments of the turn indicator described in the foregoing paragraphs may be readily installed within the linear gap between a fifth wheel and a plurality of rear wheels of a road trailer beneath the bed of a long boxsemitrailer, as well as beneath the bed of the shorter trailers used in double and triple trailer truck combinations. These embodiments provide a prominent, movable turn indicator that may be easily installed within the linear gap between a fifth wheel and a plurality of rear wheels of a road trailer, beneath a semitrailer an operated by the existing utilities already carried by the semitrailer. These embodiments provide a device and process for protecting the blind side of a vehicle while that vehicle is maneuvering in a contrary direction in preparation for turning across the roadway extending along its blind side, while the mirrors of the maneuvering road tractor are blind to the roadway. This moveable turn indicator may be easily installed along the right underside of a semitrailer, and operated with the existing air and electric utilities already installed on the semitrailer. For example, in one embodiment, a double acting piston was installed on an commercially available semitrailer using the pivoted, articulated arm described in the foregoing paragraphs to provide a low energy and compact installation, and the installation was fully operable in both the deployment mode and in the retraction mode with only six pounds per square inch of pneumatic air pressure drawn for the existing reservoir; illumination was provided by electricity already furnished on the semitrailer for the existing right turn signal. The actuator applied a substantially constant force while pivoting the arm into both its rest position as well as to its deployed position.

What I claim is:

1. A vehicular traffic indicator, comprising:

a first elongate member positionable within a linear gap between a fifth wheel and a plurality of rear wheels of a road trailer to engage an underside of the road trailer with a first major surface of said first elongate member oriented to depend vertically downwardly from the underside of the road trailer, with said first major surface terminating in a first end;

a second elongate member exhibiting an elongated second major surface terminating at a second end;

a hinge pivotably joining said second end to said first elongate member with said second major surface lying adjacent to said first major surface while said second elongate member is in a retracted position; and an actuator pivotably coupled to said first elongate member and articulately coupled to said second elongate member, to drive said second elongate member to move between said retracted position with said second major surface in juxtaposition to said first major surface and a deployed position with said second major surface being obliquely oriented relative to said first major surface and fully exposing indicia borne by said second major surface.

2. The indicator of claim 1, further comprised of means positionable in a self-propelled motor vehicle coupled to the trailer via the fifth wheel, for controlling said actuator:

to force said second elongate member to pivot between said retracted position with said second major surface lying approximately coplanar to a right vertical side of the trailer, and said deployed position, with said second major surface extending obliquely relative to the right vertical side of the trailer; and to force said second elongate member to pivot between said deployed position and said retracted position.

3. The indicator of claim 1, with said first elongate member comprised of:
 a first flange providing said first major surface;
 a second flange stationarily joined to said first flange and extending obliquely from said first major surface; and
 means for attaching said first elongate member to an underside of a trailer with said second major surface lying in a plane coplanar with a vertical side of the trailer.

4. The indicator of claim 2, with said first elongate member comprised of:
 a first flange providing said first major surface;
 a second flange pivotally supporting said actuator, said second flange being stationarily joined to said first flange and extending obliquely from said first major surface; and
 means for attaching said first elongate member to an underside of a trailer with said second major surface lying in a plane coplanar with a vertical side of the trailer.

5. The indicator of claim 1, with said actuator comprised of:
 a cylinder having a first end, a first port and a second port providing access to an interior volume of said cylinder;
 a bracket attached to and supporting said first end of said cylinder;
 a piston positioned within said cylinder to reciprocate between said between said first port and said second port; and
 a rod having a proximal end attached to said piston and a distal end extending through said first end of said cylinder, said distal end being pivotally attached to said second elongate member.

6. The indicator of claim 1, with said second elongate member comprised of:
 a plurality of electrically illuminated indicia mounted in an array along said second major surface; and
 plug couplable means connectable to an electrical circuit providing electrical power to a turn signal carried by said road trailer, for providing electrical energy illuminating said indicia during energization of said electrical circuit.

7. A vehicular traffic indicator, comprising:
 a first elongate member exhibiting a first major surface terminated by a first end, attachable to an underside of a road trailer with said first major surface oriented approximately orthogonally to a roadbed traveled by the road trailer;
 a second elongate member exhibiting a second major surface terminated by a second end pivotably coupled to said first major surface with said second major surface oriented approximately orthogonally to the roadbed; and
 an actuator comprised of:
  a cylinder having a first end, a first port and a second port providing access to an interior volume of said cylinder;
  a bracket supporting said first end of said cylinder, said bracket being pivotally attached to said first elongate member;
  a piston positioned within said cylinder to reciprocate between said between said first port and said second port; and
  a rod having a proximal end attached to said piston and a distal end extending through said first end of said cylinder, said distal end being pivotally attached to said second elongate member;
 said actuator being coupled between said first elongate member and said second elongate member, to drive said second elongate member between a retracted position with said second major surface in juxtaposition to said first major surface and a deployed position with said second major surface being obliquely oriented relative to said first major surface and fully exposing visible indicia borne by said second major surface.

8. The indicator of claim 7, further comprised of means positionable in a self-propelled motor vehicle coupled to the trailer via a fifth wheel, for controlling said actuator:
 to force said second elongate member to pivot between said retracted position with said second major surface lying approximately coplanar to a vertical right side of the trailer, and said deployed position, with said second major surface extending obliquely relative to the vertical right side of the trailer; and
 to force said second elongate member to pivot between said deployed position and said retracted position.

9. The indicator of claim 7, further comprised of means positionable in a self-propelled motor vehicle coupled to the trailer via a fifth wheel, for controlling said actuator:
 to force said second elongate member to pivot while said indicator is installed in a position within a linear gap between a fifth wheel and a plurality of rear wheels of the road trailer to engage an underside of the road trailer with said first major surface of said first elongate member oriented to depend vertically downwardly from the underside of the road trailer, between said retracted position with said second major surface lying approximately coplanar to a vertical right side of the trailer, and said deployed position, with said second major surface extending obliquely relative to the vertical right side of the trailer; and
 to force said second elongate member to pivot between said deployed position and said retracted position.

10. The indicator of claim 7, with said first elongate member comprised of:
 a first flange providing said first major surface;
 a second flange stationarily joined to said first flange and extending obliquely from said first major surface; and
 means for attaching said first elongate member to an underside of a trailer with said second major surface lying in a plane coplanar with a vertical right side of the trailer.

11. The indicator of claim 7, with said second elongate member comprised of:
 a plurality of electrically illuminated indicia mounted in an array along said second major surface; and
 plug couplable means connectable to an electrical circuit providing electrical power to a turn signal carried by said road trailer, for providing electrical energy illuminating said indicia during energization of said electrical circuit.

12. The indicator of claim 8, with said first elongate member comprised of:
 a first flange providing said first major surface;
 a second flange stationarily joined to said first flange and extending obliquely from said first major surface; and
 means for attaching said first elongate member to an underside of a trailer with said second major surface lying in a plane coplanar with a vertical side of the trailer.

13. The indicator of claim 9, with said first elongate member comprised of:

a first flange providing said first major surface;

a second flange stationarily joined to said first flange and extending obliquely from said first major surface; and means for attaching said first elongate member to an underside of a trailer with said second major surface lying in a plane coplanar with a vertical side of the trailer.

14. A vehicular traffic indicator, comprising:

a first elongate member positionable within a linear gap between a fifth wheel and a plurality of rear wheels of a road trailer to engage an underside of the road trailer with a first major surface of said first elongate member oriented to depend vertically downwardly from the underside of the road trailer, with said first major surface terminating in a first end;

a second elongate member exhibiting an elongated second major surface terminating at a second end;

a plurality of electrically illuminated indicia arrayed across said second major surface;

means for electrically coupling said indicia to an electrically powered turn signal circuit carried by the road trailer; and a double acting actuator driven by a supply of pneumatic pressure supplied to the road trailer, having a proximal end pivotably coupled to said first elongate member, and a rod coupled to a piston housed within said actuator to respond to said pneumatic pressure to drive said rod to reciprocate through said proximal end with a distal end of said rod being pivotally coupled to said second elongate member, to drive said second elongate member to move between said retracted position with said second major surface in juxtaposition to said first major surface and a deployed position with said second major surface being obliquely oriented relative to said first major surface to fully expose said indicia while said second end is positioned most distally from said first member to indicate a direction of turn by the road trailer.

15. The indicator of claim 14, with said first elongate member comprised of:

a first flange providing said first major surface;

a second flange pivotally supporting said actuator, said second flange being stationarily joined to said first flange and extending obliquely from said first major surface; and means for attaching said first elongate member to an underside of the road trailer with said second major surface lying in a plane coplanar with a vertical right side of the road trailer.

* * * * *